(12) United States Patent
Bellekens et al.

(10) Patent No.: US 12,526,314 B2
(45) Date of Patent: Jan. 13, 2026

(54) CYBER SECURITY DECEPTION SYSTEM

(71) Applicant: University of Strathclyde, Glasgow (GB)

(72) Inventors: Xavier Bellekens, Glasgow (GB); Christos Tachtatzis, Glasgow (GB); Robert Atkinson, Glasgow (GB); Ivan Andonovic, Glasgow (GB)

(73) Assignee: University of Strathclyde, Glasgow (GB)

( * ) Notice: Subject to any disclaimer, the term of this patent is extended or adjusted under 35 U.S.C. 154(b) by 138 days.

(21) Appl. No.: 18/558,858

(22) PCT Filed: May 4, 2022

(86) PCT No.: PCT/GB2022/051133
§ 371 (c)(1),
(2) Date: Nov. 3, 2023

(87) PCT Pub. No.: WO2022/234272
PCT Pub. Date: Nov. 10, 2022

(65) Prior Publication Data
US 2024/0236148 A1    Jul. 11, 2024

(30) Foreign Application Priority Data

May 5, 2021  (GR) ............................... 20210100305
Jul. 22, 2021  (GB) ..................................... 2110591

(51) Int. Cl.
*H04L 29/06* (2006.01)
*H04L 9/40* (2022.01)

(52) U.S. Cl.
CPC ................ *H04L 63/1491* (2013.01)

(58) Field of Classification Search
CPC ...... H04L 63/1491; H04L 63/08; H04L 43/00
See application file for complete search history.

(56) References Cited

U.S. PATENT DOCUMENTS

2004/0128529 A1* 7/2004 Blake ................ H04L 63/1441
  726/25
2014/0298469 A1* 10/2014 Marion ............. H04L 63/1416
  726/23

(Continued)

FOREIGN PATENT DOCUMENTS

WO  WO2013172898  11/2013
WO  WO2018025157   2/2018

OTHER PUBLICATIONS

International Preliminary Report on Patentability for corresponding Application No. PCT/GB2022/051133, mailed Nov. 16, 2023, 8 pages.

(Continued)

*Primary Examiner* — Wasika Nipa
(74) *Attorney, Agent, or Firm* — Dority & Manning, P.A.

(57) ABSTRACT

A cyber security system for protecting a networked system, the cyber security system being implemented on a computer service comprised in or provided in communication with the networked system, the cyber security system being configured to deploy an interactive deception framework configured to interact with an unauthorized entity that has accessed the networked system; the interactive deception being configured to interact with the unauthorized entity by providing artificial components of the networked system; and wherein the security component is configured to dynamically adapt or select the artificial components based on the interaction with the unauthorized entity and/or a characterization of the unauthorized entity.

12 Claims, 3 Drawing Sheets

(56) References Cited

U.S. PATENT DOCUMENTS

2017/0163682 A1    6/2017  Yu
2018/0309787 A1*  10/2018  Evron ................... G06F 11/00

OTHER PUBLICATIONS

Artrail et al., "A hybrid honeypot framework for improving intrusion detection systems in protecting organizational networks", Computers & Security, vol. 25, 2006, pp. 274-288.
PCT International Search Report and Written Opinion for corresponding PCT Application No. PCT/GB2022/051133, mailed Aug. 10, 2022, 10 pages.
UK Search Report for corresponding Application No. GB2110591.1, dated Nov. 25, 2021, 1 page.

* cited by examiner

CYBER SECURITY DECEPTION SYSTEM

CROSS REFERENCE TO RELATED APPLICATIONS

This application is a national phase application of International Application No. PCT/GB2022/051133, filed on May 4, 2022, which, in turn, is based upon and claims the right of priority to GR Patent Application No. 20210100305, filed on May 5, 2021, and GB Patent No. 2110591.1, filed on Jul. 22, 2021, the disclosures all of which are hereby incorporated herein by reference in their entireties for all purposes.

FIELD OF DISCLOSURE

The present disclosure relates to cyber security for protecting networked systems.

BACKGROUND

As the range of networking capabilities and services has increased, cyber-attack surfaces have also been increasing. In addition, the intricacy of network architectures has in turn necessitated a concomitant increase in the complexity of cyber-defenses. Many infrastructures continue to suffer from attacks, such as data breaches and deployment of crypto-ransomware, by unauthorized entities with malicious intent. These clearly demonstrate the growing technical sophistication of hackers and their ability to bypass the security measures currently in place.

Existing cyber-security systems have focused on techniques such as raising end-user cyber-situational awareness and providing system-based countermeasures. However, there has been a general lack of understanding of hacking practices, which has led to the deployment of vulnerable devices, software and architectures. Despite countermeasures and the provision of training, all networks remain vulnerable. The attack surface grows with the number of devices connected to the network and the range of applications installed. Defending large attack surfaces is challenging and requires extensive management. While Intrusion Detection Systems, firewalls and other security measures enable a high degree of protection and are key to enhancing the overall security of a network, they may also contain vulnerabilities. For example, many security systems can be effective against external threats but are ineffective against insider threats. As such, many systems are ineffective against users performing unauthorized actions or against external actors once they have breached the firewall or other external facing security measures. Furthermore, the number of false alarms can overwhelm security resources or potentially lead to genuine threats being dismissed or deprioritized as just another false alarm.

Other approaches, which can be complementary to existing methods, are desirable in countering the cyber-threat.

SUMMARY

Various aspects of the present invention are defined in the independent claims. Some preferred features are defined in the dependent claims.

According to a first example of the present disclosure is a cyber-security system for protecting a networked system, the cyber security system being implemented on a computing service comprised in or provided in communication with the networked system. The cyber security system may be configured to deploy an interactive deception framework configured to observe and/or unobtrusively interact with an unauthorized entity that has accessed the networked system. The interactive deception framework may comprise real and/or artificial components of the networked system that can be interacted with by the unauthorized entity. The security component may be configured to dynamically adapt or select the mix of real and/or artificial components. The mix of components may be configured to collaborate, e.g. the real and/or artificial components may jointly provide a narrative and/or may share details of the components or the interactions between the components and the unauthorized entity, which may provide a more realistic, plausible or seamless experience. The security component may be configured to dynamically adapt or select the real and/or artificial components based at least in part on the interaction with the unauthorized entity and/or a characterization of the unauthorized entity, e.g. using artificial intelligence and/or a set of rules.

The unauthorized entity may be or comprise a hacker or hacker network, a bot or botnet, application, computer program or script, malware or other code operating on a networked system, an organization, team or other organization that is potentially malicious, adverse or hostile to the networked system or is simply not authorized to access the networked system. The networked system may comprise a plurality of network connected devices, a server, a series of servers, one or more client devices, a distributed computing system, an internet-of-things (IoT) system, a SCADA based system, and/or the like. The networked system may comprise, be comprised in or be connected using a network, which may comprise a wide area network (WAN), a local area network (LAN), the internet, a cellular network, a wireless or wired network, an Ethernet network, an ADSL or POTS network, a Wi-Fi network, a command and control network, operational transport network and/or the like. However, it will be appreciated that a variety of networked systems are available and the present disclosure is not limited to any specific type of networked system.

The cyber security system may be run on the computing service, which may be or comprise one or more real or virtual hosts or computers of the networked system or may be or comprise one or more real or virtual hosts or computers communicatively connected or connectable to the networked system. The computing service may be cloud based and/or may comprise locally implemented infrastructure. The cyber security system may implement or be implemented using one or more form of virtualisation, which may include the use of containers. The cyber security system may implement or be implemented using a library or off-the-shelf operating system. The use of virtualised systems, including cloud based systems, and containers may allow for rapid deployment across the networked or cloud system, which may be particularly beneficial in dynamically adjustable cyber security systems.

The cyber security system may be configured to deploy a plurality of real and/or artificial components. The components may comprise or be configured to implement one or more artificial features, which may comprise, for example, a decoy, vulnerability, system feature, system update, task, difficulty, breadcrumbs, gold dust and/or the like. The cyber security system may be configured to deploy a plurality of real and/or artificial features (e.g. virtual vulnerabilities, known common vulnerabilities and exposures (CVEs), Zero-days, misconfigurations, etc) successively, sequentially or at the same time. The cyber security system may be configured to deploy a plurality of the artificial features can be deployed on computer present on the network or on the network. The successive plurality of artificial features may have different or increasing or decreasing difficulty or complexity. The deployment of the artificial features (e.g. the rate of deployment and/or selection of the artificial features) may be predefined or may be dynamic, and may depend on the previous and predicted future behaviour of the unauthorized entity. The deployment of the artificial features (e.g. the rate of deployment and/or selection of the artificial features) may be predefined or may depend on preceding or previous artificial features being overcome or not overcome (i.e. if the unauthorized entity fails to overcome the artificial feature) or a time taken for the unauthorized entity to overcome the artificial feature. The cyber security system may be configured to dynamically interact with the unauthorized entity, the dynamic interaction depending on the rate of progress of an attack on the networked system by the unauthorized entity. A rate or timescale of deployment of the artificial features may be dynamic, variable and/or controllable, wherein the rate may optionally depend on the rate of progress of an attack on the networked system. The dynamic adaption or selection of the artificial features may be dependent on a rate of progress or skill of the unauthorized entity, e.g. through one or more or each of the previously provided real and/or artificial features. For example, the interaction between the unauthorized entity and the networked system may comprise or be characterized by the sophistication of the unauthorized entity, sophistication of the attack and/or the progress of the unauthorized entity.

In general, the cyber security system is configured to dynamically vary or adapt the way in which it interacts with the unauthorized user depending on a characterization of the sophistication of the attack by the unauthorized user or a characterization of the unauthorized user themselves. Additionally or alternatively, the dynamicity may be based on, or altered using, a cloud-based system, or an on-premise system. The dynamicity may be based on the decoys. The variation or adaptation may comprise the selection of new or different artificial features (e.g. in the type or difficulty to overcome of the artificial feature) or combinations of artificial features that collaborate within a narrative or in the rate or way the artificial features are provided. In this way, the cyber security system may be configured to dynamically select different "branches" in the way it interacts with the unauthorized user or in the narrative that is presented to the unauthorized user depending on the characterization. The control of the dynamic variation or adaptation may be performed using artificial intelligence, controlled via an algorithm, based on a logic table, or by other suitable mechanism.

The decoy may comprise a real feature or virtual feature of the networked system that mimics a likely target for unauthorized entities. The decoy may be or comprise one or multiple interactive decoys. The cyber security system may be configured to monitor interactions (e.g. activity) of the unauthorized entity with the decoy, e.g. to characterize the attack and/or the unauthorized entity. At least one of the real and/or artificial components may represent some form of prize or reward or it may be in alternative implementations that none of the real and/or artificial components may represent some form of prize or reward. The decoy may comprise one or more of: a decoy machine, or virtual machine, or container, a decoy device or virtual device, a decoy webpage, a decoy document, a decoy file, or decoy information, a real device operating or configured as a decoy, a real service, computer system or network operating or configured as a decoy, a real operating system operating or configured as a decoy, a real PLC operating or configured as a decoy, and/or the like. Particularly, "artificial component" may cover a real device or system configured or operating as an artificial component or decoy. Real components may be used in addition to or as an alternative to any of the artificial components referred to herein and in any of the manners described herein with respect to artificial components. The artificial components may comprise "gold dust" which may be artificial components that are attractive or a lure to unauthorized entities, and may comprise by way of non-limiting example only at least one of: false passwords, false certificates, false files, false accounts, false credentials, false documents, etc that provide information such as user or system information, false financial, payment or bank account information, rewards or prizes, key or other information for use in encryption or other data security techniques, passwords, user information or data, intellectual property information, and/or the like. However, this is a non-exhaustive list provided for illustration to ease understanding and it will be appreciated that other types of "gold dust" may be used. The artificial components may comprise "breadcrumbs", which may be artificial components designed to lead unauthorized users along a pathway, e.g. from one particular decoy to another or to lead to particular gold dust.

The cyber security system may be configured to provide multiple narratives to the unauthorised entity. The cyber security system may be configured to deploy the artificial features (e.g. the decoys or breadcrumbs) as part of, or in the context of, the narrative or the currently selected narrative. The narrative may guide the unauthorized entity along a pathway through the deception framework, e.g. by providing implicit feedback to the unauthorized entity. The cyber security system may be configured to dynamically adjust and adapt the narrative, e.g. based on the interaction with the unauthorized entity, characterization of the unauthorized entity and/or one or more properties of the unauthorized entity. The dynamic adjustment or adaptation of the narrative in this way may help reduce noise and/or gather threat intelligence.

The cyber security system may not be limited to deploying the artificial components as virtual features, e.g. on a virtual machine or virtual environment, and may be configured to additionally provide artificial components (such as breadcrumbs) on legitimate parts of the networked system, e.g. to lead unauthorized entities to the deception network or to one or more of the artificial components.

The cyber security system may be configured to provide gamification features to the unauthorized entity. One or more of the artificial components may be based on gamification. The artificial features (e.g. the decoys, gold-dust or breadcrumbs) may be provided to the unauthorized entity conditional on a trigger condition being met, wherein the trigger condition may comprise, for example, the unauthorized entity completing one or more actions specified in the narrative, a predefined or dynamically determined time period having elapsed, and/or the like. The narrative may be arranged to lead the unauthorized entity on the pathway towards a selected one of the artificial components. The cyber security system may be configured to dynamically adjust the narrative by one or more of: dynamically selecting, providing, varying, switching, adjusting and/or otherwise changing the one or more artificial components that are provided to the unauthorized entity.

The security system may be configured to provide ranking feedback, wherein the feedback may be implicit, e.g. by providing new or more interesting decoys or gold dust rather than explicit feedback. The ranking feedback may comprise, for example, information indicative of a score, rating, ranking, ability, skill or progress of the unauthorized entity. The ranking feedback may be feedback that is indicative of the score, rating, ranking, ability, skill or progress of the unauthorized entity against at least one other unauthorized entity and/or one or more fictitious unauthorized entities. The ranking feedback may be indicative of any form of score, trophy, badge or the like that motivates the unauthorized entity. The ranking feedback may comprise any mechanism for allowing the unauthorized entity to compare themselves with fictitious or planted score, rating, ranking, ability, skill or progress of one or more other unauthorized entities. The ranking feedback may be indicative of a merit or performance in a competitive environment of the unauthorized entity. In this way, gamification techniques may be used to enhance the leading of the unauthorized entity by the narrative and/or along the pathway.

The cyber security system may be configured to characterize the unauthorized entity or the attack. The characterization may comprise determining a level of skill or abilities of the unauthorized entity, e.g. based at least on the interaction with the unauthorized entity and/or one or more properties of the unauthorized entity. The one or more properties of the unauthorized entity may comprise, for example, including but not limited to, one or more or each of: the location, the tactics, techniques and procedures used, the tools used, the rate of attacks, geo-location information, and/or the ability to explicitly or implicitly identify the unauthorized entity. The characterization may comprise determining one or more attack strategies used by the unauthorized entity. Adjusting the operation of the cyber security system and/or the dynamic adapting or selecting of the artificial components may be based at least in part on the characterization of the unauthorized entity or the attack.

The cyber security system may be configured to determine an unauthorized attack timeline and/or path. The unauthorized attack timeline may comprise at least one or more or each of: how, where and when the unauthorized entity has accessed the networked system, the paths through the networked system taken by the unauthorized entity and/or the like. The cyber security system may be configured to characterize the level of skill or abilities of the unauthorized entity based at least in part on the unauthorized attack timeline.

The cyber security system may be configured to learn or determine an engagement score. The engagement score may be a way to measure the engagement of an attacker with a specific artificial feature or vulnerability at a moment in time. The engagement score may be calculated in real time, and may be calculated based on the number of interactions with the artificial feature over a period of time. The cyber security system may be configured to actively monitor the extent/progress of the attack based on the determination of the engagement score, or changes or rate of change thereof. The dynamic adapting or selecting of the artificial components may be based at least in part on the determined engagement score. However, the engagement score may be only one of many metrics used to characterize the attack or the unauthorized entity and/or used to determine the dynamic deployment of the artificial components.

The cyber security system may be configured to provide a mirror network. The artificial component may be comprised in the mirror network. The mirror network may be or comprise a real or virtual network that mirrors, pretends to be or otherwise copies at least part of the networked system. The mirror network may be segregated virtually or physically from the networked system. The mirror network may be configured to monitor activities and operations performed in the mirror network, e.g. by the unauthorized entity. The cyber security system may be configured to perform the characterization based at least in part on the monitoring of the activities and operations performed in the mirror network, e.g. by the unauthorized entity. For example, the characterization may comprise monitoring one or more activities or actions carried out by the unauthorized entity in the mirror network and/or the networked system and may comprise determining one or more attack strategies corresponding to the determined activities or actions, e.g. by using a machine learning or other artificial intelligence system or by comparing with a look-up table or other database or the like. In this way, the mirror network may be used to obtain information about the skill level and/or attack strategies of the unauthorized entity. The machine learning can be used to respond to new attack strategies and/or to optimise the response to attacks.

The cyber security system comprises a control system that controls the dynamic adaptation or selection of the artificial components and/or the dynamic adjustment of the narrative or pathway based, which may be based on the interactions with the unauthorized entity and/or the characterization or determined properties of the unauthorized entity. The control system may control the adaptation or selection of the artificial components and/or the dynamic adjustment of the narrative or pathway using a control logic that is adaptable. The control system may implement an artificial intelligence system, e.g. to adapt the control logic. The cyber security system may be configured to provide or facilitate provision of at least the interactions with the unauthorized entity and/or the characterization of the unauthorized entity and/or any metrics determined therefrom, as inputs to the control system. The metrics determined therefrom may comprise, for example, the engagement score, time-to-reach the target, rate of progress of the attack or the unauthorized user, and/or the like. The control system may be configured to provide instructions to dynamically adapt or select the control logic and/or to dynamically select or adapt the artificial components and/or dynamically adjust the narrative or pathway, e.g. based on the interactions with the unauthorized entity and/or the characterization of the unauthorized entity and/or any of the metrics determined therefrom. The artificial intelligence system may comprise or otherwise implement a neural network such as a recurrent or regressive neural network. The neural network may have been trained, and/or is configured to be trained, with a training set. Alternatively or additionally, the artificial intelligence system, e.g. the neural network, may be configured to learn in an incremental way or retrain on the fly, or be configured to use active learning, be semi supervised, self-supervised and/or employ reinforcement learning.

The training set may be a characterized training set, e.g. in which unauthorized user actions and resulting outcomes are all pre-characterized. The training set may comprise or encompass at least one of: a plurality of different interactions of unauthorized entities having a range of different properties, skills or abilities and a plurality of different artificial component selections and/or narrative adjustments, which may be characterized. The training may be carried out by minimizing a cost function, such as a cost function that is indicative of success at leading the unauthorized entity along a desired pathway or to perform a desired action or activity. The control logic may allocate system resources. The adaptation of the control logic may comprise varying the allocation of system resources, e.g. based at least the interactions with the unauthorized entity and/or the characterization of the unauthorized entity and/or any metrics determined therefrom. Although specific techniques such as neural networks have been described above, it will be appreciated, that other suitable technique could be used to implement and/or adapt the control logic, which may or may not be based on artificial intelligence, such as decision trees, belief networks, other probabilistic models, genetic algorithms, or other types of neural network other than those listed above, and/or the like.

The artificial intelligence system may be trained to determine likely next moves or actions or the most likely next move or action by the unauthorized entity. The artificial intelligence system may be configured to predict future actions, such as a next step or action, of the unauthorized entity and/or where they are most likely go or which path or branch they at most likely to choose, e.g. based on one or more or each of: the actions performed by the unauthorized entity during the attack, on the characterization of the unauthorized entity and/or based on a scenario or vulnerability deployed and/or any of the metrics determined therefrom. For example, the artificial intelligence system may have been trained or is trainable on a training set comprising training data indicative of a plurality of moves and actions taken by entities and wherein the training set may have been trained or is trainable by minimizing a cost function indicative of accuracy of prediction of subsequent actions or moves based on preceding actions or moves. The training data may be pre-provided or the artificial intelligence system may be trained on the fly, e.g. using self-characterized data. The control system may be configured to dynamically adapt or select the artificial components and/or dynamically adjust the narrative or pathway based at least in part on the determined likely next moves or actions or the most likely next move or action by the unauthorized entity.

The artificial intelligence system may be configured to perform some or all of the characterization. For example, the artificial intelligence system may be configured to determine one or more attack strategies used by the unauthorized entity. In this way, the system may be more resilient to variations in attack strategy and new developments in attack strategy.

The artificial intelligence system may be configured to perform correlations and/or characterisation based on a single interaction or multitude of interactions, based on one or multiple faux services deployed within the same network, or across a multitude of networks, which may include but are not limited to one or more or each of: private networks, the internet, cloud-based systems and networks, or blockchain networks. to characterise the unauthorised entity.

The cyber security system may be configured to automatically provide an alarm, alert, message, information such as characterization information, or the like to a system operator, upon detecting the attack or upon interaction by the unauthorized entity with one or more of the artificial features or other components of the deception network. The cyber-security system may inform on the optimum countermeasure to end an attack based on the characterization of the attack and/or the unauthorized user and/or the interactions of the unauthorized user with the artificial components.

By providing features described above, the cyber security system may be configured to provide a dynamically adaptable decoy network that is adapted according to strategy and behaviour of the unauthorized entity. The cyber security system may be pre-defined and/or capable or learning or adapting to new attack strategies and tactics of the hacker. The cyber security system may also be rapidly deployable on a range of systems. The cyber security system may be configured to delay the unauthorized entity, characterize the unauthorized entity and the attack and dynamically deploy, inform on a change and/or adapt a defence strategies and countermeasures from a range of defence strategies and counter measures, the dynamic deployment, change and/or adaptation being based on the characterization.

According to a second example of the present disclosure is a cyber-security method for protecting a networked system, the cyber security method comprising deploying an interactive deception framework configured to interact with an unauthorized entity accessing or attempting to access the networked system. The interactive deception framework may comprise artificial components of a networked system that can be interacted with by the unauthorized entity. The method may comprise dynamically adapting or selecting the artificial components. The method may comprise dynamically adapting or selecting the artificial components based at least in part on the interaction with the unauthorized entity and/or a characterization of the unauthorized entity.

According to a third example of the present disclosure is a computer program product comprising computer readable instructions that, when implemented on a computer arrangement comprised in or communicatively connected to a networked system, cause the computer arrangement to implement the method of the second example.

The computer program product may be embodied on a tangible, non-transient carrier medium.

The individual features and/or combinations of features defined above in accordance with any example of the present disclosure or below in relation to any specific embodiment may be utilised, either separately and individually, alone or in combination with any other defined feature, in any other example or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Embodiments will now be described by way of example only, and with reference to the accompanying drawings, of which.

DETAILED DESCRIPTION OF THE DRAWINGS

As used herein, except where the context requires otherwise, the terms "comprises", "includes", "has", and grammatical variants of these terms, are not intended to be exhaustive. They are intended to allow for the possibility of further additives, components, integers or steps.

It will be appreciated that the cyber security system described herein is computer implemented, and can be provided as part of a networked system that it is protecting or as a separate system that is communicatively connected or connectable to the networked system. In one example, the cyber security system is beneficially implemented using a Software Defined Network (SDN) controller of the networked system, or a Zero-trust overlay network layer, but the disclosure is not limited to this arrangement and the implementation of the cyber security system on other components of, or connected to, the networked system being protected is possible.

Examples described herein discuss dynamic selection or variation. As discussed herein, dynamic may comprise in real-time, in near real time, in a time frame typically associated with the given action or at least during the course of an attack or the associated part or action of the attack.

References are also made to unauthorized entities. The unauthorized entities may comprise human or computer implemented entities, or organizations or networks. For example, unauthorized entities may encompass but is not limited to hackers, hacker networks, bots, botnets, apps, other software tools or systems, organizations, malicious or hostile government or other actors, and/or the like. In general, unauthorized entities could refer to any entity for which access to the networked system has not been authorized or has been expressly excluded or limited by an appropriate authority responsible for controlling access to the networked system. Furthermore, the unauthorized entities may be internal threats such as users that have been authorized to carry out certain actions, but are exceeding or abusing their status to carry out unauthorized, unwanted or malicious actions. This is important as the systems and methods described herein are particularly effective at dealing with both external and internal threats, and even external threats that are internal to the network, e.g. that have bypassed outward facing security measures such as firewalls, relative to other security systems such as firewalls and the like, which may be predominantly effective against only external entities.

Examples described herein comprise cyber security systems and services that provide deception frameworks, an element in identifying and combating next generation sophisticated hackers and other unauthorized entities. Deception based systems are systems that are designed to dynamically trick or mislead unauthorized entities to perform or to not perform an action. In particular, examples of a cyber-security system 5 described herein are provided with the ability to dynamically adapt the decoy deception framework in response to dynamic changes in attack strategies and behaviours exhibited by unauthorized entities, thereby extending the protection of the network until such time that the unauthorized entity can be fully characterised. This in turn can inform the selection of the most appropriate action to arrest the attack.

Figure 1:
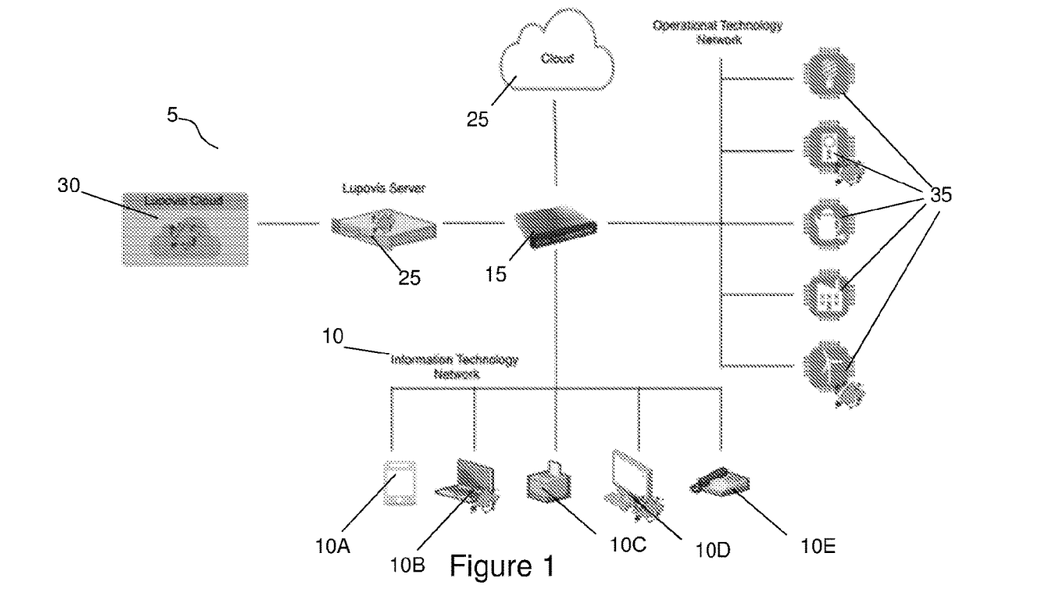
FIG. 1 is a schematic showing an example of an implementation of a cyber-security system on a server within a networked system.

FIG. 1 shows an example of a server based cyber-security system 5 implemented as part of a networked system 10. The networked system 10 can include multiple devices 10A-10E such as but not limited to tablets, smartphones, laptop computers, desktop computers, printers, communications apparatus and the like. However, it will be appreciated that any "smart" or other network enabled device could be part of the networked system 10 and potentially a vulnerability. The devices 10A-10E could all be local to each other or one or more or each of the devices could be remotely located. The networked system 10 comprises network infrastructure 15, which comprises components for operating the networked system 10 such as one or more of: at least one server, a network controller, switching systems, routers, and/or the like, as is well known in the art. The devices 10A-10E communicate with the network infrastructure 15 using conventional data network communications channels. The networked system 10 can employ any of a variety of architectures such as a server-based system or a cloud 25 based system and/or the like, and the cyber-security system 5 is not limited to use with any specific network architecture.

Figure 2:
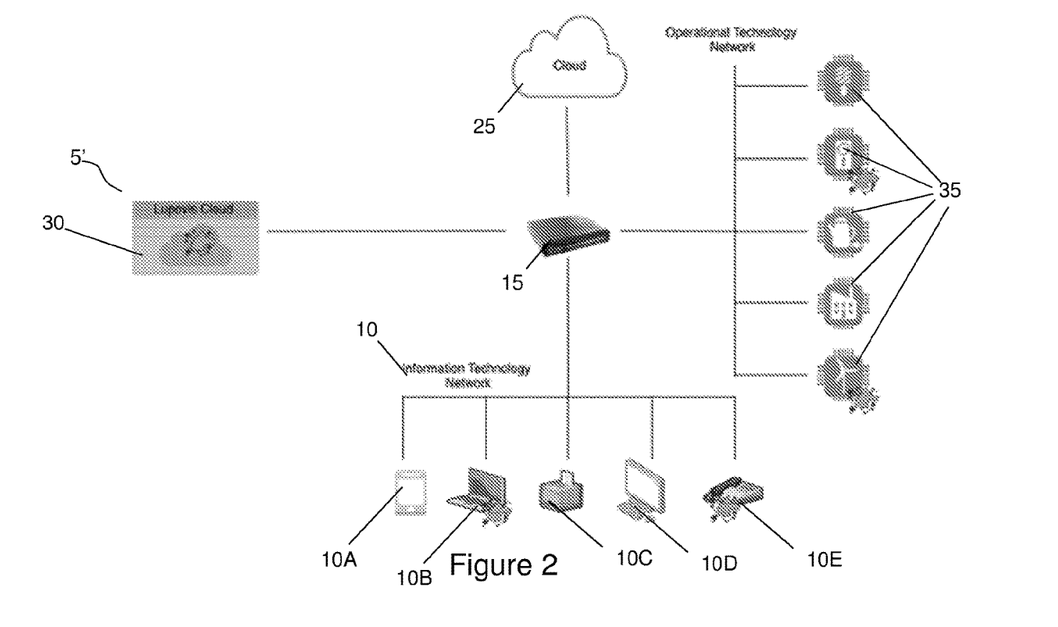
FIG. 2 is a schematic showing an example of an implementation of a cloud based cyber-security system within a networked system.

In the example of FIG. 1, the cyber-security system 5 comprises a security server 25 and a cloud-based component 30, wherein the security server 25 is a system that interfaces with the network infrastructure 15 (e.g. to analyse and determine parameters and state information of the network infrastructure 15) and the cloud component 30. However, the architecture is not limited to this and other suitable architectures could be used. As another non-limiting example, an alternative arrangement is shown in FIG. 2 in which the cyber-security component 5' is cloud based and the cloud component 30 of the cyber-security component 5' is in direct communication with the network infrastructure 10. Again, these two architectures are provided by way of examples, and other architectures could be used.

The cyber-security system 5, 5' is configured to deploy an interactive deception framework to observe and/or unobtrusively interact with any unauthorized entity accessing or attempting to access the networked system 10. The interactive deception framework comprises artificial or virtual components of the networked system that can be interacted with by the unauthorized entity. The artificial or virtual components are intended to be faux components of the actual networked system and could comprise or be configured to implement as examples one or more of: decoys, artificial vulnerabilities, system features, system updates, tasks, difficulties, breadcrumbs, gold dust and/or the like. However, these are simply provided as examples and it will appreciated that other artificial components could be used in order to interact with unauthorized users. The artificial components can be virtual components provided in a virtual attack framework formed by the cyber-security system 5, for example using a virtualized deception host server that hosts a virtual environment. Alternatively or additionally, the artificial components can be provided on the real network system, e.g. on the components of the network infrastructure 10 and/or on the devices 10A-10E. The artificial components (e.g. the virtual components) are provided in the context of a narrative 35 or scenario that provides a plausible context associated with the particular networked system 10 and provides artificial components of the type that an unauthorized entity might expect to see on that particular networked system. Beneficially, the cyber-security system can access multiple narratives 35 or scenarios and dynamically adapt, switch or change the narrative 35 or scenario in real time and on the fly during the attack responsive to at least interactions of the unauthorized entity with the artificial components and/or a characterization of the attack or of the unauthorized entity.

The artificial components are configured to report interactions with the artificial components to the cyber-security system 5 (e.g. directly or indirectly to the cloud component 30). The cyber-security system 5 is configured to dynamically adapt or select the artificial components based at least in part on the interaction with the unauthorized entity with the artificial components and a characterization of the unauthorized entity.

When an entity (e.g. the unauthorized entity) interacts with the artificial component the cyber-security system analyses the interactions and characterizes the entity. The characterization assesses properties such as skill, actions and location of the unauthorized entity and could also comprise a characterization of whether the entity is an authorized entity or an unauthorized entity. Based on at least the characterization of the unauthorized entity and the actions performed by the unauthorized entity, a suitable narrative can be selected and dynamically adapted by a controller 305 (se FIG. 3) implemented by the cloud component 30 of the cyber-security system 5, 5' in order to maintain the attack progression on determined deception paths. This could involve, for example, deploying new artificial components, which may be different, e.g. of a different type, difficulty or complexity of artificial component or be associated with a different narrative. This approach may avoid the limitations of alternate solutions in which an attacker is guided on a uni-directed path towards a pre-determined decoy machine/device.

For example, the cyber-security system 5 can be configured to determine a metric representative of engagement of the unauthorized entity, e.g. using an engagement score, which can be based at least on part on the interactions of the unauthorized user with the artificial components and/or other characterization of the unauthorised user. If the engagement of the unauthorized user as measured by the engagement score is low or is dropping by more than a threshold amount, then a difficulty or complexity of the artificial component could be reduced or a different artificial component (e.g. a different type of artificial component or an artificial component having a lower difficulty or an artificial component associated with a different scenario or narrative, or the like) could be deployed. As another example, the cyber-security system 5 can be configured to monitor progress and/or rate of progress of the unauthorized entity. If the unauthorized entity is taking too long, e.g. over a threshold amount of time, to overcome or access one or more of the artificial components, then a difficulty or complexity of the artificial component could be reduced or a different artificial component could be deployed. Conversely, if the unauthorized user is progressing too quickly, e.g. less than a threshold amount of time to overcome or access one or more of the artificial components, then a difficulty or complexity of the artificial component could be increased or a different artificial component could be deployed.

Figure 3:
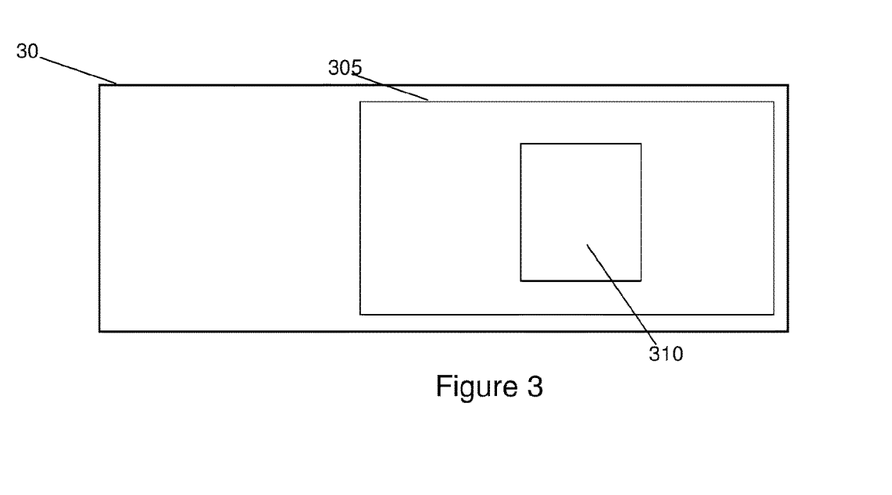
FIG. 3 is a schematic overview of an architecture of a deception framework deployed by the cyber security systems shown in FIGS. 1 and 2.

Features of the cloud based component 35 are shown in detail in FIG. 3. The cloud based component comprises a controller 305 that implements an artificial intelligence engine 310.

The controller 305 in this example is configured to dynamically deploy the artificial components using artificial intelligence via the provision of the artificial intelligence engine 310, which is configured to employ artificial intelligence techniques such as machine learning to dynamically select, update and deploy an interactive deception framework configured to interact with the unauthorized entity accessing or attempting to access the networked system 10. The interactive deception framework comprises the artificial components that can be interacted with by the unauthorized entity. The artificial intelligence engine 310 is configured to dynamically adapt or select the artificial components based at least in part on interaction between the artificial components and the unauthorized entity and a characterization of the unauthorized entity.

The cyber-security system 5 using the artificial intelligence engine is configured to employ additional strategies to enhance the deception framework including gamification techniques, selection and dynamic variation in narratives provided to unauthorized entities, manipulation techniques and use of gratification to lead unauthorized entities along a decoy pathway. The deployment and examples of these approaches are show in FIG. 4, which shows an example of an architecture of the deception framework deployed by the cyber security system 5. The system 5 operates once traditional methods such as IDs, firewalls, and other security methodologies have been breached. As such, it can be complementary to existing cyber security techniques.

Figure 4:
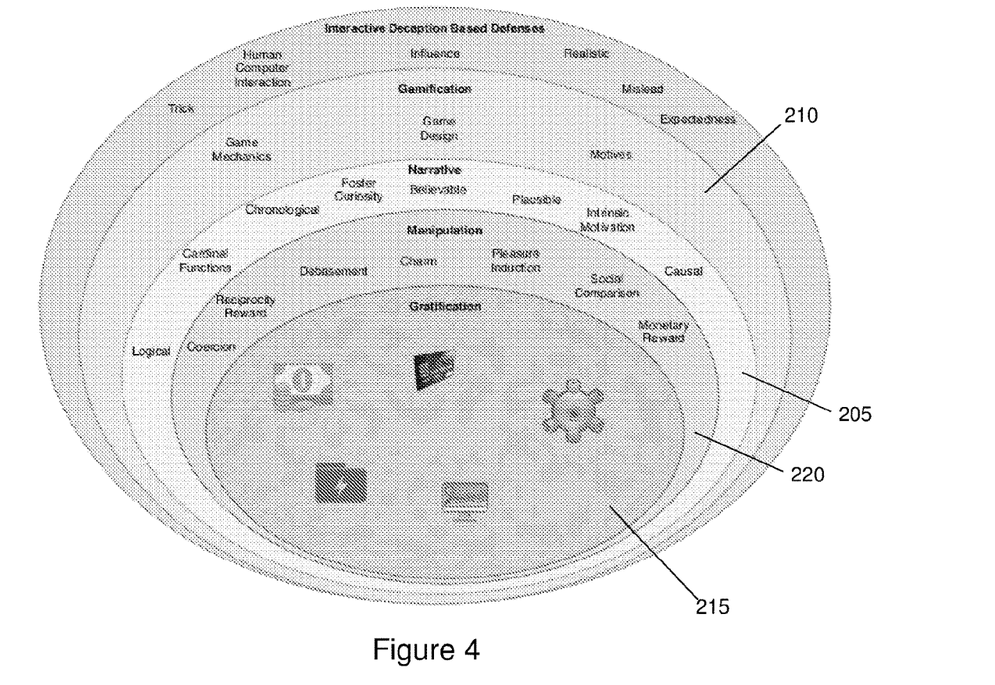
FIG. 4 is a schematic of components of a cloud component of the cyber-security system of FIG. 1 or FIG. 2.

As indicated by 205, the cyber-security system 5, specifically the artificial intelligence engine 310, selects, provides and dynamically adapts the artificial components to construct and dynamically adapt the narrative 35. The narrative 35 provides reactive guidance to the hacker in order to maintain the attack progression on pre-determined deception paths that can be dynamically adapted by the artificial intelligence engine 310 in response to at least actions taken by the unauthorized entity as part of the attack. The narrative 35 provides a causal, logical and chronological chain of events to the unauthorized entity.

By taking into account the selection and dynamic adaptation of the narrative 35 based on the characterization of the unauthorized entity, the narrative 35 can be selected and/or adapted to follow the intrinsic motivation of the unauthorized entity. Furthermore, the narrative 35 can be made more plausible, as different network architectures may have different vulnerabilities and rewards, and hence, intrinsic motivations. The narratives 35 can be selected to cultivate the curiosity of unauthorized entities as the narrative unfolds.

This can be achieved by aligning the narrative 35 to gamification of the cyber security system 5. To this end, the cyber-security system 5 (e.g. the artificial intelligence engine) provides a narrative 35 comprising a believable chain of events based on potential cyber-attacks and vulnerabilities induced within the virtualized deception host servers 25. The narratives 35 provided by the cyber security system 5 are dynamic and constructed on-the-fly, before, during and after a breach. The gamification fully supports the narrative, guiding the unauthorized entity to its next step. While the unauthorized entity can perform a number of actions, they are unable to influence the outcome of the gamification without following the pathway that the narrative 35 is intended to lead the unauthorized entity down.

As indicated by 210, the cyber security system 5, controlled by the artificial intelligence engine, selects, provides and dynamically adapts the artificial components (such as decoy vulnerabilities) in a way that utilizes gamification to engage with the unauthorized entity. In particular, gamification concepts are used to engage with the unauthorized entity and to sustain the deception throughout the attack. The gamification approaches implemented in examples of the include provision of the artificial components that are of particular interest and value to unauthorized entities 35 such as passwords, certificates, and files that feed information to the unauthorized entity, and the like, to extend the deception through compelling feeds that convince the unauthorized entity to remain on the determined path. The present examples use artificial components in an innovative way, by encouraging unauthorized users to interact with them. The gamification is supported by providing games features such as scoring or ranking information that gives the unauthorized entity the ability to assess their own performance or to rank themselves against those of planted or decoy unauthorized entities. For example, the cyber security system, e.g. the artificial intelligence engine 310, can be configured to deploy decoy log information as part of the narrative 30, the decoy log information detailing fictitious previous hacks and time taken to access a decoy component in order to incentivise the unauthorized entity to try to beat the fictitious "achievements" of the other unauthorized entity. The selection of the appropriate gamification strategy by the artificial intelligence engine 310 may be selected and deployed based on the narrative 35 currently deployed (so as to appear consistent and genuine), the actions of the unauthorized entity (e.g. based on determined skill of the unauthorized entity or other characterization of the unauthorized entity (e.g. based on the unauthorized entity's location or type, e.g. a human hacker may have different motivators to a cyber-warfare organization or a ransomware bot, for example).

As indicated by 215, the cyber-security system 5, controlled by the artificial intelligence engine 310, selects, provides and dynamically adapts the artificial components in a way that utilizes gratification concepts to provide rewards to the unauthorized entity. The application of gratification by the cyber-security system 5 is dynamically selected and updated during the attack based at least on the actions performed by the unauthorized entity and the characterization of the unauthorized entity. This could comprise provision of artificial components in the form of decoy information or goals to the unauthorized entity but which come at a corresponding cost to the unauthorized entity. For example, a decoy artificial component such as a fake credit card or other financial information can be provided and, if the unauthorized entity achieves the decoy, then fake data sheets or account details may be provided in the narrative in order to continue to tempt and lead the unauthorized entity down the determined or predetermined deception pathway. The artificial components used to provide the gratification are selected to be appropriate for the deployed narrative 35 and networked system 10, e.g. financial decoys or goals for financial services networks, product information for research facilities, network schema for power plants, and the like.

The gamification 210, narrative 205 (equivalent to a selected narrative 35 from FIGS. 1 and 2) and gratification 215 techniques provided by the cyber-security system 5 can be further enhanced by manipulation techniques 220 that appeal to the specific unauthorized entity and which can be determined based on characterization of the unauthorized entity. Manipulation can be defined as the action of controlling someone at your advantage. For example, if the unauthorized entity is determined to be a hacker, then fabricated pages or files that indicate that another hacker has followed the same path may be provided by the cyber security system 5 as part of the deployed narrative 205 in order to manipulate the unauthorized entity into a determined or pre-determined pathway with the fictitious knowledge that a decoy host has been breached in the past such that it may be particularly vulnerable or important.

One example of manipulation that can be deployed is coercion, which is the practice of making someone perform a forced action by using threat or force. Through data gathering and characterization of the unauthorized entity, and behavioural analysis, e.g. by analysing the actions performed by the unauthorized entity during the attack such as interactions with one or more of the artificial components, the cyber security system 5 (e.g. the artificial intelligence engine) is configured to modify the narrative 205 and gamification elements relating to a specific unauthorized entity or type or category of unauthorized entity, thereby facilitating the deployment of suitable coercion techniques such as displaying a coercive error message, so as to entice the hacker to follow a pre-defined path. Another approach that can be employed is the provision of reciprocity rewards.

For example, when collecting information about the unauthorized entity's abilities or skill, it may be beneficial to provide tests having a range of difficulties to the unauthorized entity so as to determine a skill level based on what difficulties of test the unauthorized entity can overcome. Reciprocal rewards can be provided to users without vulnerability scanners, the rewards comprising the provision of further tests and allowing the unauthorized entity to discover the further tests or other elements. Debasement techniques can be deployed, which comprise lowering or varying the difficulty level of tasks or vulnerabilities in order to keep an unauthorized entity interested and progressing along a desired pathway. Charm can be applied by the cyber-security system 5 providing complimentary comments, e.g. on the skill level of the user. Other examples of techniques that can be deployed by the cyber-security system 5 (e.g. by the artificial intelligence engine 310) include pleasure induction, social comparison e.g. by decoy website defacement or decoy messages left by fictitious hackers, monetary rewards, or the like. It will be appreciated that the type and implementation of the techniques deployed can be dynamically determined and adapted by the artificial intelligence engine 310 based on at least the actions performed by the unauthorized entity during the attack and metrics derived therefrom (e.g. such as the determination of skill of the unauthorised entity, the rate of progress of the unauthorised entity, the time-to-target, the engagement score, and/or the like), the characterization of the unauthorized entity (e.g. based on properties such as the location of the unauthorized entity, and the like), and/or the scenario 35 being deployed on the virtualized deception host server 25.

Importantly, examples described herein use artificial intelligence techniques such as machine learning implemented by the artificial intelligence engine 310 to learn how to respond to new attack strategies, and to determine how to respond to and dynamically update the deception framework in view of the actions performed by, and the characterization of, the unauthorized entity. In particular, it will be appreciated from the above that dynamic selection, deployment and updating of the narrative 205 and the associated gamification 210 and gratification 215 techniques based on at least the actions performed by the unauthorized entity such as the interactions of the unauthorized user with the artificial components (and metrics derived therefrom) and the characterization of the unauthorized entity can be highly beneficial in providing effective deception and leading of the unauthorized entities. The artificial intelligence approach to the selection, deployment and updating of the narrative and the associated gamification and gratification techniques described herein has been found to be particularly effective in this regard.

All interactions with the artificial components, including time, behavioral data (i.e. keystroke dynamics, activity tracking, etc.), and engagements between the unauthorized entity 35 and the artificial components are recorded and processed by artificial intelligence engine. These recorded interactions can be used as part of the unauthorized entity characterization process and the determination of actions of the unauthorized entity. As described above, this allows the unauthorized entity to be served with dynamically variable polymorphic vulnerabilities 30 which, in turn, can increase or decrease the difficulties of the artificial vulnerabilities over time, keeping the unauthorized entity 35 engaged. The interaction information is fed to the artificial intelligence engine 310, which provides the unauthorized entity with rewards based on pre-defined scenarios that can be dynamically selected and varied by the artificial intelligence engine 310 using an algorithm or model. Using threshold measures or other suitable categorization techniques, the interest of the unauthorized entity is further analyzed. For example, if interest scores of the unauthorized entity are below threshold, subtle clues can be provided to the unauthorized entity. The clues are inbuilt in each scenario. The clues lure the unauthorized entity to seamlessly continue their malicious activity by following the pre-defined path, without suspecting that they are interacting with artificial components provided in a virtual environment and/or on components of the network infrastructure 10 and/or network connected devices 10A-10E. The path leads to data being gathered on the attacks, techniques and tools used by unauthorized entities to solve, overcome or access the challenges presented by each artificial component. All the gathered information is further analyzed using a circular methodology, enabling the artificial intelligence engine 310 to characterize the unauthorized user to enhance the variability of the artificial components.

Figure 5:
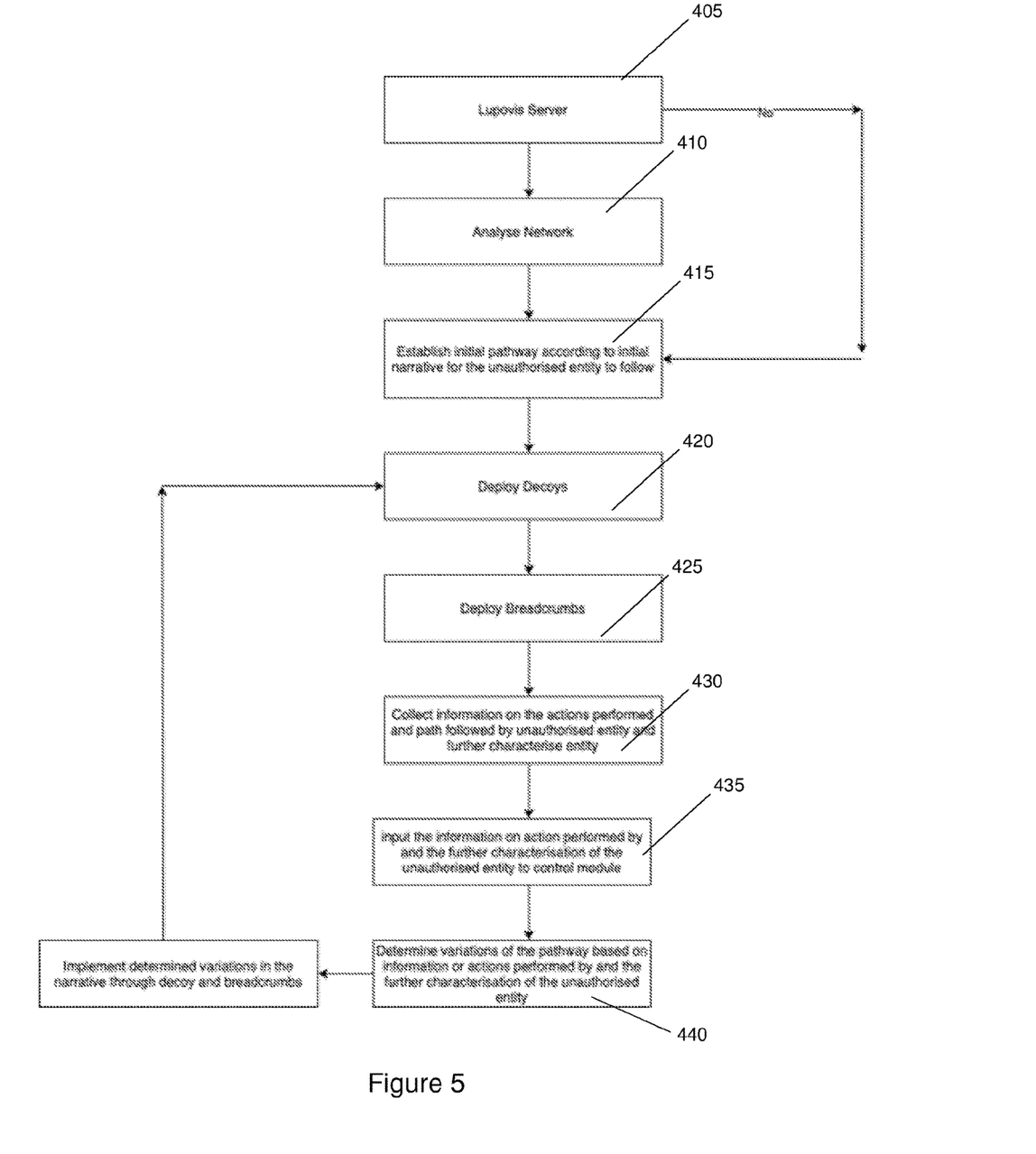
FIG. 5 is a flowchart showing a method of operation of the cyber security system of FIG. 1.

FIG. 5 describes a method of operation of the cyber security system 5. The method may be carried out by a suitable computing resource comprised in or connected to the networked system 10.

Step 405 represents alternative process flows depending on whether the cyber-security system 5, 5' is server based or on a premise (e.g. as shown in FIG. 1) or not (e.g. the cloud-based system of FIG. 2). If the cyber-security system 5 is server based and/or on a premise then the cyber-security system 5 analyses the network (step 410) and uses information on the unauthorized entity and/or the attack based on at least both the network analysis and interaction of the unauthorized entity with the artificial components. Otherwise, the cyber-security system 5' uses information on the unauthorized entity and/or the attack based on the interaction of the unauthorized entity with the artificial components.

In step 415 the controller of the cyber-security system 5, 5' (e.g. the artificial intelligence engine thereof) establishes an initial narrative and associated pathway of artificial components for provision to the unauthorized entity. This may comprise a default initial pathway and narrative but preferably comprises a dynamically determined pathway and narrative, which could be randomly selected or selected based on the network analysis if applicable, or any other information on the attack or unauthorized entity available to the controller. The initial pathway and narrative are associated with the particular networked system 10.

In step 420, one or more artificial components (in this example decoys) for the unauthorized entity are deployed. In step 425, one or more artificial components acting as "breadcrumbs" are also deployed, the breadcrumbs acting to lead the unauthorized entity along the pathway, e.g. from one decoy to another. The artificial components (e.g. the decoys and breadcrumbs) are selected to be part of the initial pathway and narrative.

In step 430, the cyber-security system 5, 5' is configured to collect information on the actions performed by the unauthorized entity and the path followed by the unauthorized entity. For example, this may be based on information supplied by the artificial components on the interaction of the unauthorized entity with the artificial component and/or information from the networked system 10 itself via network analysis or any other information gathering techniques known in the art, such as IP address tracing and the like.

In step 435, the further information collected after the deployment of the artificial components (decoys and breadcrumbs) is collected and used to characterize the unauthorized entity and/or the attack. For example, as indicated above, the controller may determine one or more metrics of the attach and/or the unauthorized entity such as but not limited to the engagement of the unauthorized entity, the skill level or ability of the unauthorized entity, the location of the unauthorized entity, the type of unauthorized entity, a rate of progress of the attack or unauthorized entity and/or the like. The characterization of the unauthorized entity and/or attack and optionally the information itself is input into the artificial intelligence engine for processing.

In step 440, the artificial intelligence engine determines variations of the pathway and/or narrative based on the gathered information, including the further information gathered after the deployment of the artificial components (e.g. decoys and breadcrumbs), and on the characterization of the unauthorized entity and the attack. Based on the determined variations of the pathway and/or narrative, corresponding changes in the artificial components to be deployed can be determined and implemented (step 445). Thereafter, the new or varied artificial components can be deployed, with the process looping back round to step 420.

The artificial intelligence algorithms implemented by the artificial intelligence engine 310 of the controller 305 output parameters such as an indication of vulnerabilities, tasks or features to provide as part of an adapted pathway to be provided according to an adapted narrative to the unauthorized entity. In this way, the levels of challenge or difficulty of the artificial vulnerabilities, tasks and features provided as part of the pathway can be varied as a function of the skill of the hacker so as to sustain engagement with the artificial features (e.g. the decoys).

In examples, the parameters output by the artificial intelligence algorithms include an indication of likely or most likely next attacker action based on the inputs, e.g. based on past actions executed since the attack started, the characterization of the unauthorized entity and/or the scenario or vulnerability being deployed.

In examples, the artificial intelligence algorithms are configured to learn and/or output metrics such as an 'engagement score' determination. The metrics empower the protection function to make judgements on whether, for example, to continue monitoring the unauthorized entity 35 and the evolution of the attack to gain further information and characterization or to automatically stop the attack as quickly as possible.

The artificial intelligence algorithms of the artificial intelligence engine 310 can be provided using any suitable machine learning technique such as a neural network, such as but not limited to a regressive neural network (RNN). The neural network is trained using a training set. The training set comprises or encompass at least one of: a plurality of different interactions of unauthorized entities having a range of different properties, skills or abilities and a plurality of different virtual component selections and/or narrative adjustments and/or the like. The training can be carried out by minimizing a cost function, such as a cost function that is indicative of success at leading the unauthorized entity along a desired pathway or to perform a desired action or activity. The artificial intelligence engine can be trained to determine likely next moves or actions or the most likely next move or action by the unauthorized entity. For example, the artificial intelligence engine can be trained on a characterized training set comprising training data indicative of a plurality of pre-characterized moves and actions, e.g. successive moves or actions, taken by exemplary entities and wherein the machine learning algorithm is trained by minimizing a cost function indicative of accuracy of prediction of subsequent actions or moves based on preceding actions or moves. In alternative examples, the artificial intelligence engine can be self-trained or configured to learn 'on the fly'. In other examples, the controller implements a logic engine instead of the artificial intelligence engine 310, wherein the logic engine implements algorithms or mathematical techniques that are not artificial intelligence based, but the logic engine otherwise serves the same purpose and performs the same function as the artificial intelligence engine.

The controller 305 can implement logic to automatically end the attack at a suitable end point based on the ongoing characterization of the attack, e.g. based on an amount of progress of the attack and/or the rate of attack. When the controller 305 determines that the attack is to be ended, then suitable countermeasures are selected based on the characterization of the unauthorized entity and deployed to end the attack based on the controller logic.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

References to a processor made herein may comprise one or more processors to perform functions of the invention by operating on input data and generating output. Such a processor may be a programmable processor executing a computer program to perform those functions and/or the hardware design of the processor may itself configure the processor to perform the functions. Processors suitable for the execution of a computer program include microprocessors (including but not limited to microprocessors designed as central processing units) and, microcontrollers, graphics processing units (GPUs), maths co-processors, tensor processing units and the like. References to a processor made herein may comprise special purpose logic circuitry, such as an FPGA (field programmable gate array), an ASIC (application-specific integrated circuit), analogue processing circuitry or other customised circuitry, which optionally may be provided discrete and/or integrated components. Generally, a program-executing processor will receive instructions and data from a read-only memory or a random access memory or both. The processor and memory may be comprised in a computing device and also include, or be operatively coupled to receive data from or transfer data to, or both, one or more mass storage devices for storing data, e.g. magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. The communications module described herein may be configured for local communications, or remote and/or wide area communications, e.g. over a network such as an Ethernet network, a cellular communications network, the internet or the like. The communication module may be configured for wired, cabled and/or other physically connected communications. The communication module may be configured for wireless communications, e.g. using 3G, 4G, 5G, Wi-Fi, Bluetooth, ZigBee, proprietary wireless protocols, and/or the like.

The invention claimed is:

1. A cyber security system comprising a hardware processor and a memory for protecting a networked system, the networked system comprising infrastructure components for operating the networked system, the cyber security system being implemented on a computer service comprising a deception host server, the computer service being configured for in communication with the networked system over a network, the cyber security system being configured to:
   deploy an interactive deception framework configured to interact with an unauthorized entity;
   successively deploy a plurality of real and/or artificial components having increasing or differing difficulty or complexity dependent on a previous artificial component being overcome;
   provide a narrative to the unauthorized entity, the narrative comprising feedback that guides the unauthorized entity along a pathway through the deception framework, wherein a control system is configured to dynamically adjust the narrative based on at least one or each of: the interaction with the unauthorized entity, characterization of the unauthorized entity and/or one or more properties of the unauthorized entity;
   the interactive deception framework being configured to interact with the unauthorized entity by providing artificial components in an environment hosted by the deception host server, wherein the artificial components are faux components of the networked system that can be interacted with by unauthorized entities, and configured to report interactions between the artificial components and the unauthorized entity to the control system of the cyber security system implemented on the computer service; and
   wherein the control system of the cyber security system implemented on the computer service is configured to at least one of:
   dynamically adapt the real artificial components wherein the dynamic adaption or selection of the real and/or artificial components is dependent on a rate of progress or skill of the unauthorized entity at overcoming previous real and/or artificial components; or
   to select and deploy further artificial components;
   based on the interaction with the unauthorized entity and/or a characterization of the unauthorized entity.

2. The cyber security system of claim 1, wherein one or more of the artificial components comprise a decoy, the decoy comprising a decoy machine, or virtual machine, a decoy device or virtual device, a decoy webpage, a decoy document, a decoy file, decoy information, a real device operating or configured as a decoy, a real service, computer system or network operating or configured as a decoy, a real operating system operating or configured as a decoy or a real networked node operating or configured as a decoy.

3. The cyber security system of claim 1, wherein the narrative comprises providing one or more different artificial components that are provided to the unauthorized entity upon the unauthorized entity completing one or more actions from the pathway involving the artificial component.

4. The cyber-security system of claim 1, configured to determine an engagement score based on a number of interactions of the unauthorized entity with the an artificial feature over a period of time; and wherein the cyber-security cyber security system is configured to dynamically adapt or select the artificial components to deploy based at least in part on the determined engagement score.

5. The cyber security system of claim 1, configured to characterize the location within the networked system and/or characterize the level of skill or abilities of the unauthorized entity based on the interaction with the unauthorized entity.

6. The cyber security system of claim 5, configured to determine an unauthorized attack timeline comprising at least one or more or each of: where and when the unauthorized entity has accessed the networked system and the paths through the networked system taken by the unauthorized entity.

7. The cyber security system of claim 1, configured to provide a mirror network as part of the interactive deception work, mirror network being a real or virtual network that mirrors or represents at least part of the networked system.

8. The cyber security system of claim 7, wherein the mirror network is configured to monitor activities and operations performed in the mirror network by the unauthorized entity and to determine or characterize the interaction with the unauthorized entity and/or information on skills, abilities and/or strategies of the unauthorized entity.

9. The cyber security system of claim 1, comprising a control system that implements a machine learning system that is provided with at least the interactions with the unauthorized entity and/or the characterization of the unauthorized entity as inputs and is configured to provide instructions to dynamically adapt or select the real and/or artificial components and/or dynamically adjust the narrative or pathway based on the interactions with the unauthorized entity and/or the characterization of the unauthorized user entity.

10. The cyber security system of claim 9, wherein the artificial intelligence system is configured to identify new attack classes based at least the interactions with the unauthorized entity and/or the characterization of the unauthorized entity.

11. A cyber security method for protecting a networked system, that comprises network infrastructure components for operating the networked system, the cyber security method comprising:
deploying, at least partly in an environment hosted by a deception host server of a computer service that is configured for communication with the networked system over a network, an interactive deception framework configured to interact with an unauthorized entity accessing or attempting to access the networked system, wherein the interactive deception framework comprises real artificial components in the environment hosted by the deception host server, wherein the artificial components are faux components of the networked system that can be interacted with by the unauthorized entity;
successively deploying, at least partly in an environment hosted by a deception host server of the computer service that is configured for communication with the networked system over a network, a plurality of real and/or artificial components having increasing or differing difficulty or complexity dependent on a previous artificial component being overcome;
providing, using the computer service that is configured for communication with the networked system over a network, a narrative to the unauthorized entity, the narrative comprising feedback that guides the unauthorized entity along a pathway through the deception framework, wherein a control system of a cyber security system implemented on the computer service and from the artificial components is configured to dynamically adjust the narrative based on at least one or each of: the interaction with the unauthorized entity, characterization of the unauthorized entity and/or one or more properties of the unauthorized entity;
receiving, at the control system of the cyber security system implemented on the computer service and from the artificial components, reports of interactions between the artificial components and the unauthorized entity; and
dynamically adapting or selecting and deploying, by the control system, the artificial components based at least in part on the interaction with the unauthorized entity and/or a characterization of the unauthorized entity, wherein the dynamic adaption or selection of the real and/or artificial components is dependent on a rate of progress or skill of the unauthorized entity at overcoming previous real and/or artificial components.

12. A non-transitory computer readable storage medium storing computer readable instructions that, when implemented on a computer arrangement comprised in or communicatively connected to a networked system, cause the computer arrangement to:
deploy an interactive deception framework configured to interact with an unauthorized entity accessing or attempting to access the networked system, wherein the interactive deception framework comprises artificial components in an environment hosted by a deception host server, wherein the artificial components are faux components of the networked system that can be interacted with by the unauthorized entity, and configured to report interactions between the artificial components and the unauthorized entity to a control system of the cyber-security a cyber security system implemented on a computer service;
successively deploy a plurality of real and/or artificial components having increasing or differing difficulty or complexity dependent on a previous artificial component being overcome;
provide a narrative to the unauthorized entity, the narrative comprising feedback that guides the unauthorized entity along a pathway through the deception framework, wherein the control system is configured to dynamically adjust the narrative based on at least one or each of: the interaction with the unauthorized entity, characterization of the unauthorized entity and/or one or more properties of the unauthorized entity; and
causing the control system to dynamically adapt or select and deploy the artificial components based at least in part on the interaction with the unauthorized entity and/or a characterization of the unauthorized entity, wherein the dynamic adaption or selection of the real and/or artificial components is dependent on a rate of progress or skill of the unauthorized entity at overcoming previous real and/or artificial components.

* * * * *